United States Patent [19]
Becher

[11] 3,845,891
[45] Nov. 5, 1974

[54] SIDE AND REAR MOUNT TIRE CARRIER
[76] Inventor: Steven J. Becher, P.O. Box 783, Dolores, Colo. 81323
[22] Filed: Sept. 22, 1972
[21] Appl. No.: 291,253

[52] U.S. Cl............................. 224/42.21, 214/453
[51] Int. Cl........................................... B62d 43/02
[58] Field of Search........... 224/42.21, 42.06, 42.08, 224/42.12, 42.13, 42.24, 42.28, 42.29, 29 R; 214/451, 453, 454, 452, 450

[56] References Cited
UNITED STATES PATENTS

| | | | |
|---|---|---|---|
| 3,283,973 | 11/1966 | Wargo | 224/42.21 |
| 3,326,434 | 6/1967 | Cheadle | 224/42.21 |
| 3,371,832 | 3/1968 | Sekino et al. | 224/42.21 |
| 3,398,846 | 8/1968 | Ragan et al. | 224/42.21 X |
| 3,655,220 | 4/1972 | Rodgers | 214/454 |
| 3,753,520 | 8/1973 | Bodde | 224/42.21 X |

Primary Examiner—Robert J. Spar
Assistant Examiner—Jerold M. Forsberg
Attorney, Agent, or Firm—Berman, Bishoff & Platt

[57] ABSTRACT

A carrier is described for mounting a tire at the rear or side of a jeep or other vehicle and for selectively changing the mounting from side to rear or vice versa. The carrier operates on a scissors principle, with two sections pivotally folding up on one another for side mounting and the entire assembly pivoting around a corner or the vehicle for rear mounting. The two sections are unfolded and extended for rear mounting, where two specially designed latches hold the assembly in proper position.

6 Claims, 8 Drawing Figures

SIDE AND REAR MOUNT TIRE CARRIER

This invention relates generally to carrier devices for mounting articles on the exterior of automotive vehicles and more particularly relates to a spare tire carrier for selectively changing the mounting of a spare tire from the side to the rear of a jeep or other similar vehicle, and vice versa.

It has been found that particularly in the case of jeeps, and other similar vehicles, where the spare tire is mounted on the exterior thereof, it is highly advantageous to be able to change the position of the spare tire from the rear to the side or from the side to the rear. Each type of mounting, i.e. side and rear, has its particular advantages. For example, a rear mounting will allow the vehicle to pass through narrower places and when wide wheels and tires are used on the vehicle, will avoid damage caused by the rear tires rubbing against the spare tire. By the same token, side mounting of the spare tire has, among others, the advantages of permitting access to the rear of the vehicle without having to remove the spare tire and permitting the use of a tow bar without requiring the removal of the conventional tire carrier. A further consideration, of course, is the appearance of the vehicle and the owner's personal preference with respect thereto.

Clearly then, it would be desirable to have a tire carrier which permits a spare tire to be selectively moved back and forth between a side mounting and a rear mounting. However, heretofore no such device has been known.

Accordingly, it is the principal object of the present invention to provide a spare tire carrier for jeeps and similar vehicles which permits the spare tire to be interchangeably mounted at the rear or side of the vehicle.

A further object of the present invention is to provide a side and rear mount tire carrier that is simple to change from one position to the other and does not require complete removal or disassembly of the carrier.

Still another object of the present invention is to provide a side and rear mount tire carrier for jeeps and similar vehicles which has relatively few moving parts and which will be inexpensive and easy to manufacture.

Briefly, the side and rear mount tire carrier of the present invention comprises two sections which are hinged together, with the entire assembly being pivotably mounted at the corner of the vehicle which joins the rear and side surfaces of the vehicle. When the tire carrier is in the side mount position, the two sections are folded on one another and latched in place. For rear mounting, the two sections are swung around the corner mount and fully extended. Two specially designed latches then hold the assembly in proper position for rear mounting.

Other objects, advantages and features of the present invention will be more readily appreciated from the following detailed description taken in conjunction with the drawings, in which.

Figure 1:
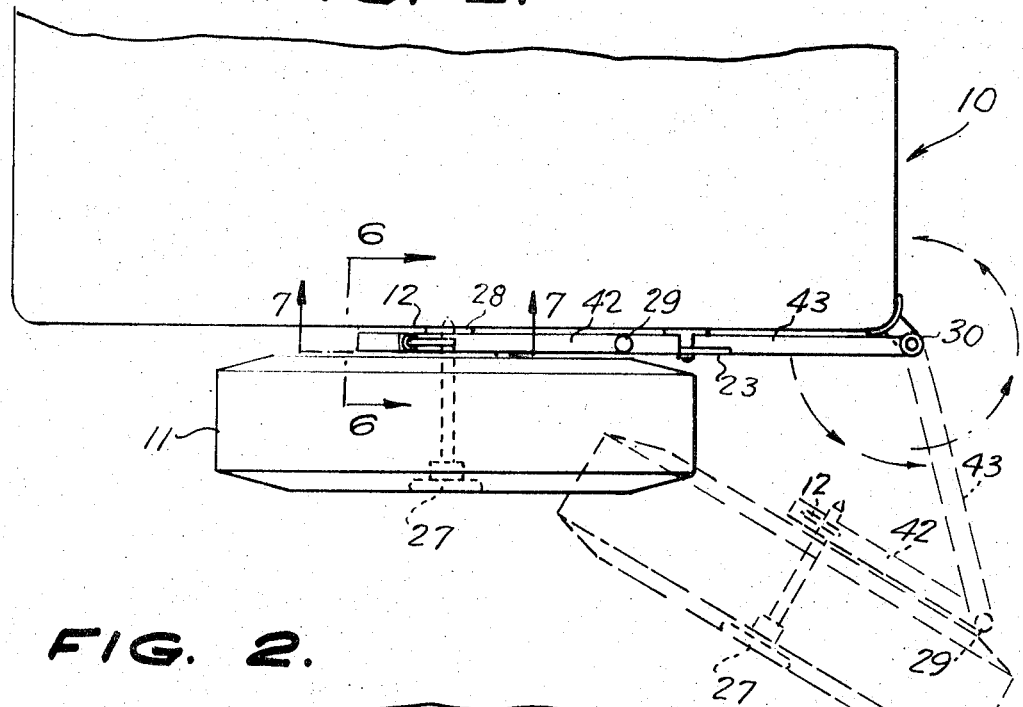
FIG. 1 is a top plan view of the tire carrier of the present invention mounted at the rear of a vehicle, also showing in dotted lines the intermediate position of the tire as it is moved from the rear to the side mounting.

Referring now to the drawings wherein like reference numerals designate like parts throughout the several views, there is shown a jeep, or other vehicle 10 to which the present invention is applied. A conventional spare tire 11, in accordance with the present invention, may be mounted either at the rear or the side of the jeep 10, as will be presently explained.

Figure 2:
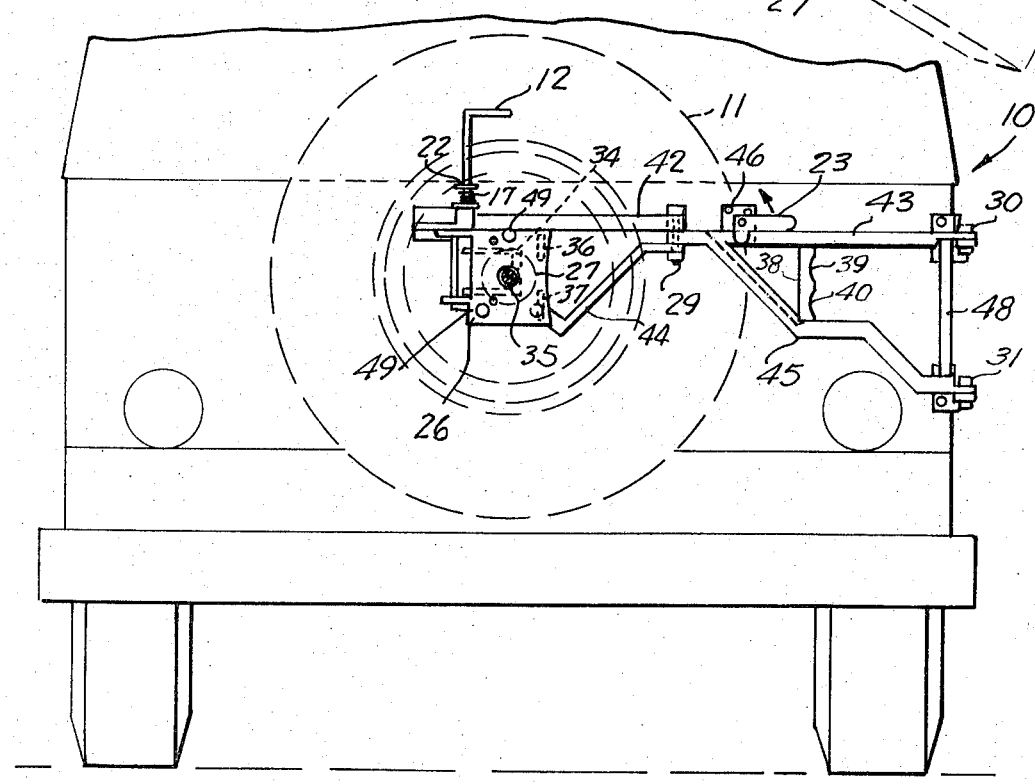
FIG. 2 is an elevational view of the tire carrier of the present invention with the tire mounted at the rear of the vehicle.

Making reference first to FIGS. 1 and 2, the tire carrier of the present invention will be seen in its rear mount position. Tire 11 is mounted on tire holder plate 26 by conventional means, such as tire lugs 49. Tire holder plate 26 is welded or otherwise conventionally secured to the left-hand section of the tire carrier, as viewed in FIGS. 1 and 2. The left-hand section of the tire carrier is formed of horizontal angle iron 42 and diagonal brace 44 which are joined at hinge 29 with horizontal angle iron 43 of the right-hand section of the tire carrier. The right-hand section also comprises stepped diagonal brace 45 and vertical brace 38, having cutouts 39 and 40 therein, for a purpose which will appear presently. Corner vertical brace 48 is mounted on hinged mountings 30 and 31, which permit the entire tire carrier assembly to be swung from the rear of jeep 10 to the side thereof, as shown by the arrows and dotted line position of the assembly in FIG. 1.

In order to retain the tire carrier in its fully extended rear mount position, as shown in FIGS. 1 and 2, two locking means are provided. The first of these is rear catch 23 which is rotatably mounted on backing plate 46 on the rear of the jeep. As can be seen, catch 23 slips over horizontal angle iron 43 and prevents the right-hand section from pivoting outwardly around hinges 30 and 31, when in the position shown. This catch may also be raised in the direction of the arrow in FIG. 2, which would permit the assembly to pivot about hinges 30 and 31.

The left-hand section of the tire carrier is locked in place by a latch mechanism comprising handle 12 having upper latching pin 13 and lower latching pin 14 which engage respectively with upper dowel rods 20 welded to upper angle iron 15 and lower dowel rods 21 welded to lower angle iron 16.

Figures 6, 7:
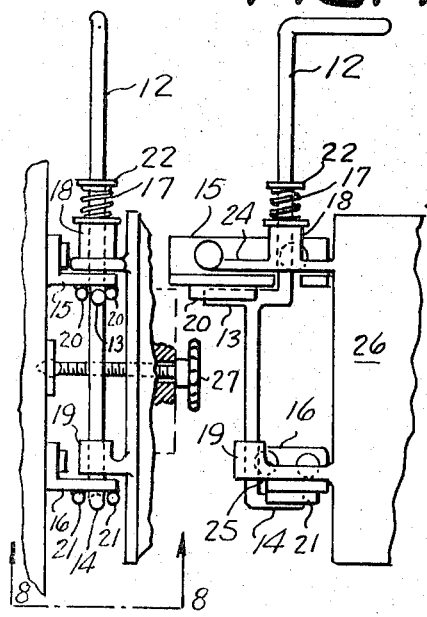
FIG. 6 is a partial sectional view taken on the line 6—6 in FIG. 1, looking in the direction of the arrows.
FIG. 7 is a partial sectional view taken on the line 7—7 in FIG. 1, looking in the direction of the arrows.
Figure 8:
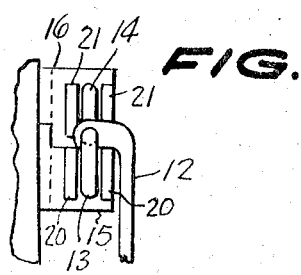
FIG. 8 is a partial bottom plan view, looking upward in FIG. 6, illustrating the details of a latching mechanism utilized in mounting the tire at the rear of the vehicle.

As shown in more detail in FIGS. 6, 7 and 8, upper angle iron 15 is bolted or otherwise secured to the rear of jeep 10 and lower angle iron 16 is similarly secured to the rear of the jeep. Handle 12 passes through upper bushing 18 and lower bushing 19 which are welded or otherwise secured to tire holder plate 26 respectively by upper stabilizer arm 24 and lower stabilizer arm 25. Spring 17, which is held in place by retaining flange 22 on handle 12, serves to normally keep the handle in its fully extended position when it is not engaged.

In order to operate the latching mechanism comprising handle 12 and its associated apparatus, the tire carrier is first swung around to the full line position shown in FIG. 1. Handle 12 is then depressed against the force of spring 17 and the entire tire assembly is pushed inwardly toward the rear of the jeep. When upper stabilizer arm 24 is entirely seated upon upper angle iron 15, and lower stabilizer arm 25 is entirely seated upon angle iron 16, handle 12 is then pulled up, causing upper latching pin 13 to engage in the groove formed between upper dowel rods 20 and lower latching pin 14 to similarly engage in the groove formed between lower dowel rods 21. In order to release this latching mechanism, handle 12 is pushed downwardly and the tire is pulled straight back from the rear of jeep 10.

Figure 3:
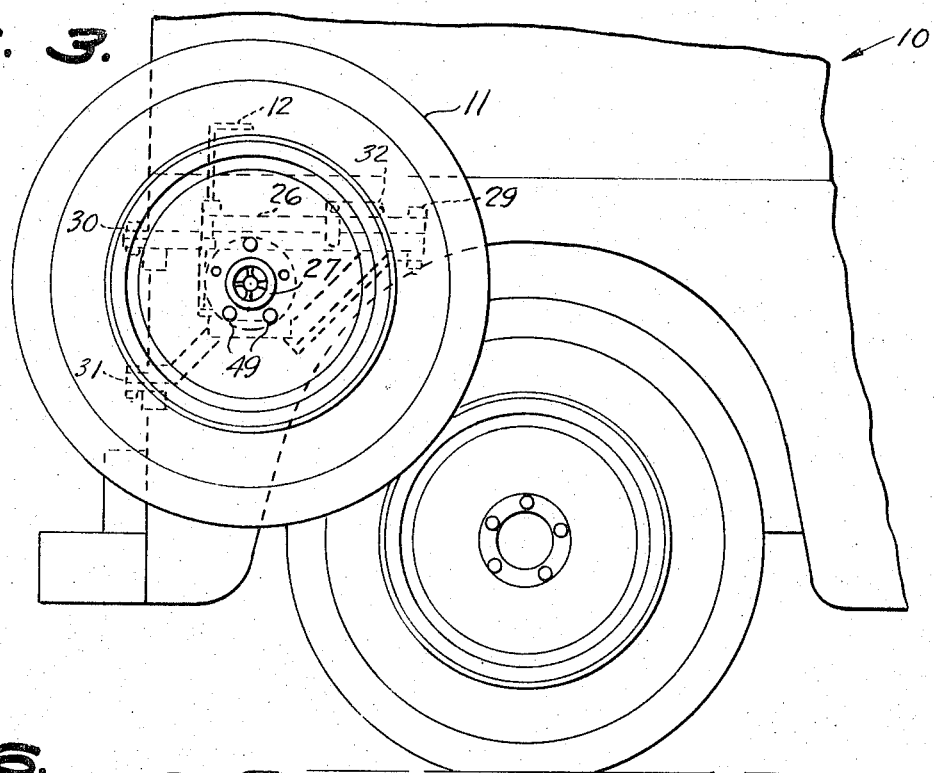
FIG. 3 is a side elevational view of the tire carrier of the present invention with the tire mounted at the side of the vehicle.
Figure 4:
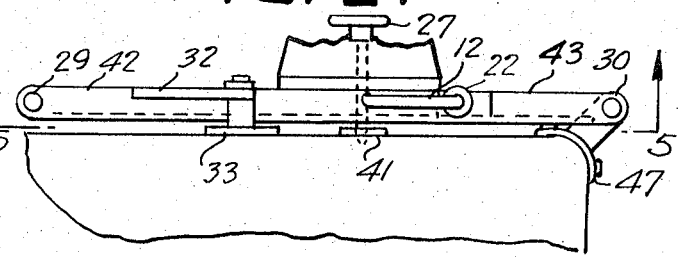
FIG. 4 is a partial top plan view of the tire carrier, as shown in FIG. 3.
Figure 5:
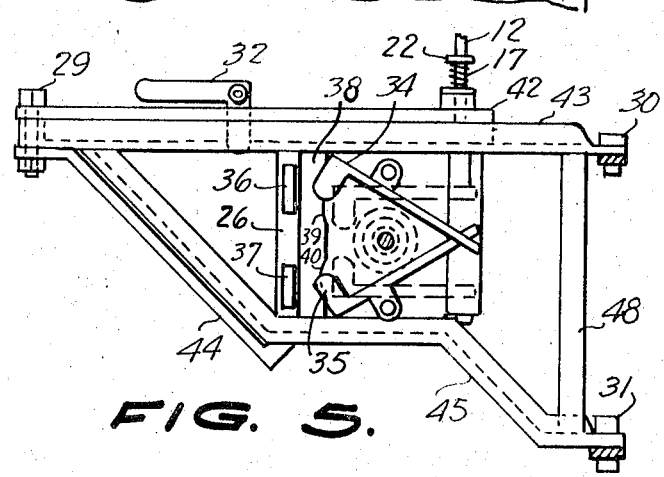
FIG. 5 is a partial sectional view taken on the line 5—5 in FIG. 4, looking in the direction of the arrows.

Referring now to FIGS. 3, 4 and 5, the details of the side mount latching mechanisms will now be described. After the above-described rear latching mechanisms have been released, the left and right sections of the tire carrier are folded inwardly upon one another about hinge 29, as shown in the dotted line position in FIG. 1. The entire assembly may then be swung around hinges 30 and 31 to the side of the vehicle. In order to hold the two sections together, a latching mechanism is provided which is probably best seen in FIG. 5. This mechanism comprises upper side mount latch 34 and lower side mount latch 35 rotatably mounted on the inner surface of tire holder plate 26. Upper and lower spacers 36 and 37 are also mounted on the tire holder plate for providing the proper spacing. When it is desired to lock the two sections of the carrier together for side mounting, side mount latches 34 and 35 are swung to the full line positions shown in FIG. 5, from the dotted line positions. In passing from the unlatched to the latched positions, latches 34 and 35 pass through the clearance provided by cut-outs 39 and 40 in vertical brace 38 and wedge against the outer surface of brace 38 in order to hold the two sections together.

In order to hold the tire carrier assembly against the side of the jeep, after it has been secured in the folded position, as described above, side latch handle 32, rotatably mounted on backing plate 33, is dropped over the front of the assembly in the position shown in FIGS. 3, 4 and 5. This latch operates in precisely the same way as rear catch 23, described above.

When it is desired to change the tire mounting from the side to the rear, the above-described series of steps is then reversed. It should thus be seen that tire 11 may be readily interchanged between a side and rear mounting, and vice versa.

An additional safety feature which may be provided at either or both the side and the rear mounting positions involves the use of screw member 27. This member passes through the center of tire 11 and engages with plate 28, mounted at the rear of the jeep or with plate 41 mounted at the side of the jeep, depending upon the position of the tire. Through the use of screw 27, tire 11 is held more securely in place in either of its two mounting positions.

It can thus be seen that the present invention provides a mechanism for readily interchanging the spare tire mounting of a jeep or similar vehicle from the rear to the side, or vice versa in a simple manner requiring the expenditure of little effort.

While a particular embodiment of the invention has been described, it will be readily apparent to those skilled in the art that various modifications may be made therein without departing from the spirit of the invention and it is, therefore, intended that the scope of the present inention be defined only by the claims appended hereto.

I claim:

1. A carrier for selectively mounting an article on either of two adjacent intersecting body surfaces of a vehicle, comprising:
   a. an arm having a first section and a second section pivotally connected with respect to each other;
   b. means for pivotally mounting the end of said first section, remote from said second section, for rotation about a vertical axis at the intersection of said surfaces;
   c. means for securing said article to said second section;
   d. first latching means for securing said carrier to the first of said adjacent surfaces; and
   e. second latching means for securing said carrier to the second of said adjacent surfaces after said carrier has been pivoted about said intersection;
   f. whereby said carrier is secured to the second surface in a folded position and to the first surface in an extended position.

2. The carrier set forth in claim 1, wherein said first section comprises said first latching means, and said first surface is provided with means cooperating with said first latching means.

3. The carrier set forth in claim 2, wherein said first latching means comprises spring-loaded handle means having latching pins mounted thereon for engaging with said cooperating means.

4. The carrier set forth in claim 3, wherein said cooperating means comprises spaced pairs of parallel rods forming grooves therebetween for receiving said latching pins.

5. The carrier set forth in claim 2, further including means for securing said first section to said second section, when the two sections are folded upon each other about said hinge.

6. The carrier set forth in claim 5, wherein said second section comprises a vertical brace and said means for securing comprises third latching means for lockingly engaging said brace, when said sections are folded upon each other.

* * * * *